Figure 1:
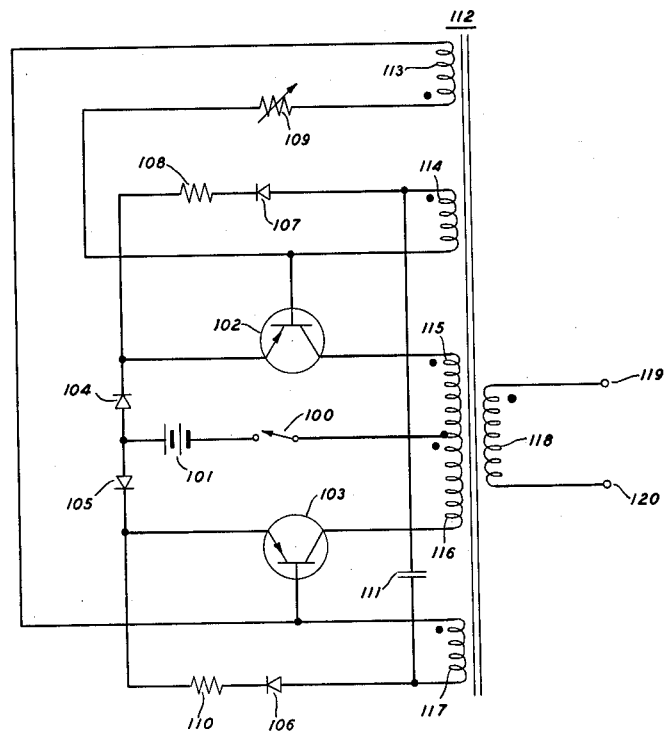

April 17, 1962 F. V. KADRI 3,030,589
CURRENT SUPPLY APPARATUS
Filed Aug. 16, 1960 2 Sheets-Sheet 1

INVENTOR
F. V. KADRI
BY
ATTORNEY

April 17, 1962 F. V. KADRI 3,030,589
CURRENT SUPPLY APPARATUS
Filed Aug. 16, 1960 2 Sheets-Sheet 2

INVENTOR
F. V. KADRI
BY V. P. Priolo
ATTORNEY

# United States Patent Office 3,030,589
Patented Apr. 17, 1962

3,030,589
CURRENT SUPPLY APPARATUS
Fred V. Kadri, Madison, N.J., assignor to Bell Telephone Laboratories, Incorporated, New York, N.Y., a corporation of New York
Filed Aug. 16, 1960, Ser. No. 50,038
8 Claims. (Cl. 331—57)

This invention relates to current supply apparatus and more particularly to apparatus for converting direct current to alternating current which, in turn, may be rectified.

In many electrical and electronic systems ranging in scope from high fidelity audio to guided missiles it is important to employ power systems which amplify direct current and supply it at a constant magnitude to a given load. Such power supply systems must possess an extremely high degree of reliability with a relatively high order of absolute current stabilization. Power supply systems of the transistor core converter type are small, light, efficient and require no maintenance, posses the required degree of reliability and stability and, therefore, qualify for broad application.

A converter circuit generally employs a plurality of transistors and a saturating transformer for converting direct-current to alternating current which, in turn, may be rectified. The transistors function as automatic switches, i.e., conductive or nonconductive, to complete circuits for supplying current from a direct-current source to a portion of a transformer winding alternately in opposite directions. Each circuit is completed through a transistor switch, the switching or "on" period of which is usually determined by the core saturation of the saturating transformer. As a result, the circuit is frequency sensitive to input voltage changes, the switching time is relatively long thus decreasing efficiency, rectangular loop core material is necessary for efficient operation, the frequency of the configuration is difficult to adjust and voltage or current spikes are present when the transformer goes into deep saturation.

The prior art has also taught converter configurations wherein the frequency is determined by the inductance of a nonsaturating transformer winding in combination with transistor saturation. Such circuits, however, also require relatively long switching times because of the storage time required for the consumption of excess minority carriers in a transistor driven from saturation to cutoff. There is, in addition, a spike of excess current due to simultaneous conduction through the "turning-on" and the "turning-off" transistor resulting in excess heat and noise.

It is, therefore, an object of this invention to provide a transistor core converter which does not depend upon core saturation switching action.

Another object of this invention is to provide a transistor core converter which does not depend upon either the transformer winding inductance or the transistor saturation for switching action.

Another object of this invention is to provide a transistor core converter circuit which is not frequency sensitive to input voltage changes.

Another object of this invention is to provide a transistor inverter circuit which can be easily adjusted to a desired frequency or varied over a range of frequencies independent of input voltage.

Another object of this invention is to provide a converter circuit wherein excess current and voltage spikes are eliminated thus reducing noise to a nominal level.

Another object of this invention is to provide an improved transistor oscillator.

It has been found that these objects may be achieved by employing a resistor-capacitor network for frequency control.

A feature of this invention resides in the use of a control circuit comprising an adjustable resistor-capacitor network and a nonsaturating transformer winding connected in the transistor biasing circuits.

Figure 2:
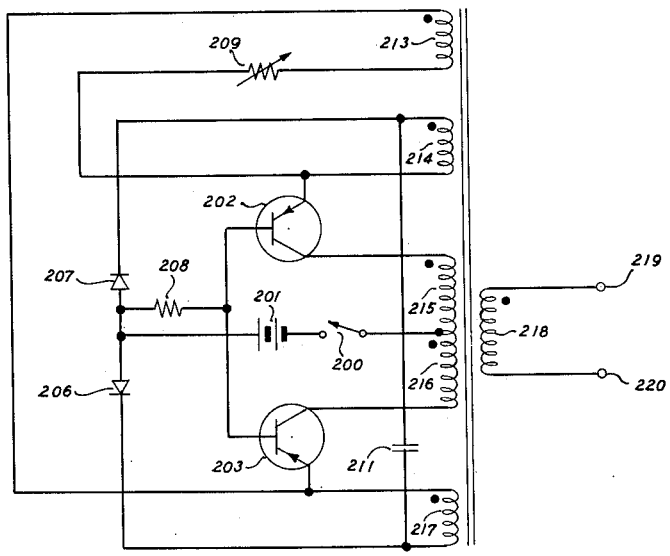
Figure 3:
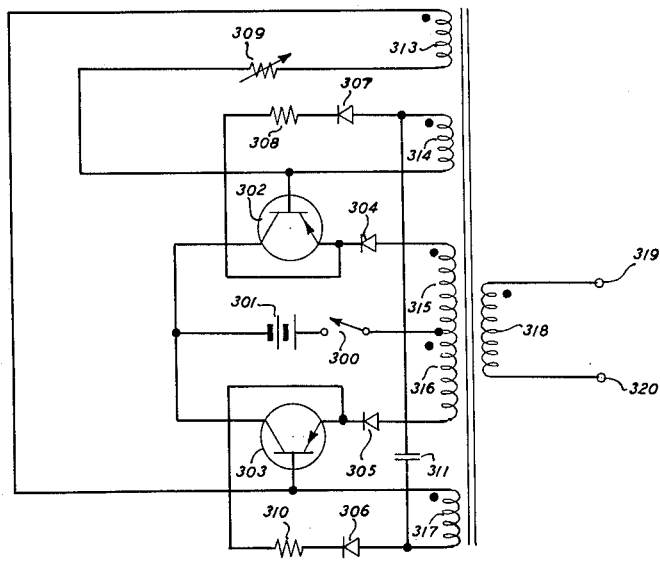

Other objects and features of the present invention will become apparent upon consideration of the following detailed description when taken in connection with the accompanying drawing in which:

FIG. 1 is a schematic representation of an electrical circuit comprising a common emitter embodiment of the invention; and FIGS. 2 and 3 are schematic representations of electrical circuits comprising the common base and common collector embodiments, respectively, of the invention.

Referring now to FIG. 1 of the drawing there is provided a direct-current source 101, a single pole, single-throw switch 100, p-n-p transistors 102 and 103, resistors 108, 109 and 110, asymmetrically conducting devices 104, 105, 106 and 107, capacitor 111 and a nonsaturating transformer 112 with windings or winding portions 113, 114, 115, 116, 117 and 118. Terminals 119 and 120 are output terminals.

One terminal of the direct-current supply source 101 is connected through switch 100 to the common terminal of winding portions 115 and 116. Asymmetrically conducting devices 104 and 105 are connected from the other terminal of the direct-current source 101 to the emitter electrodes of transistors 102 and 103. The collector electrodes of transistors 102 and 103 are connected to the other terminals of winding portions 115 and 116, respectively. The base electrode of transistor 102, winding 114, asymmetrically conducting device 107, resistor 108 and the emitter electrode of transistor 102 are serially connected. The base electrode of transistor 103, winding 117, asymmetrically conducting device 106, resistor 110 and the emitter electrode of transistor 103 are serially connected. The base electrode of transistor 102, adjustable resistor 109, winding 113 and the base electrode of transistor 103 are also serially connected. Capacitor 111 is connected from one terminal of winding 114 to the corresponding terminal of winding 117. Although this configuration uses only p-n-p transistors it should be understood that n-p-n transistors could be used equally as effectively.

Assuming that at the instant the switch 100 is closed transistor 102 is biased into conduction, current will flow from the direct-current supply source 101 through the collector-emitter path of transistor 102 into the dot of winding portion 115 and back to the direct-current supply source 101. Tracing the induced current flow with the aid of the dot convention, it is noted that transistor 102 is biased further into conduction while transistor 103 is biased further into cutoff. For illustrative purposes, it is assumed that capacitor 111 is initially charged to a potential V positive at the base of transistor 103 and negative at the base of transistor 102. The capacitor 111 discharges and charges to the opposite potential exponentially with time through winding 117, winding 113, adjustable resistor 109 and winding 114. Since there is complete circuit symmetry the value of the charge V on capacitor 111 must be equal and opposite for alternate half cycles.

When capacitor 111 has discharged and charged sufficiently so that the potential at the base of transistor 103 is low enough to permit transistor 103 to conduct, transistor 102 will be driven into cutoff. The positive potential appearing at the base of transistor 102 due to the charge on capacitor 111 will tend to hold transistor 102 in cutoff. Capacitor 111 again discharges and charges in the opposite direction of the previous discharge and charge, through winding 114, adjustable resistor 109, winding 113 and winding 117. When the potential at the base of transistor 102 becomes low enough transistor 102 will again be biased into conduction thus cutting off transistor 104. Winding 113 provides the additional potential which is necessary to supplement the symmetrical potentials of the biasing windings and thus obtain the switching actions as described heretofore. The cycle then continually repeats itself until switch 100 is opened. It should be noted that varying the resistance of adjustable resistor 109 will vary the charge-discharge time of capacitor 111 thus varying the frequency of the configuration.

Resistors 108 and 110 are base current limiting resistors. Asymmetrically conducting device 105 is placed between one of the terminals of the direct-current supply source 101 and the emitter of transistor 103 to eliminate an additional current path which would otherwise exist across the capacitor 111 by virtue of the base resistance 110 and the emitter-base junction of transistor 102. Asymmertically conducting device 104 performs a similar function during the succeeding half cycle. Also, during the latter part of the nonconducting half cycle of each transistor the winding end of its base resistor becomes negative relative to the positive supply terminal and, consequently, asymmetrically conducting devices 106 and 107 are inserted to prevent reverse current flow through the base resistor during these intervals.

FIGS. 2 and 3 are second and third embodiments of the invention wherein the transistors are connected in the common base and common collector configurations, respectively. The designation numerals of FIGS. 2 and 3 are identical to those of FIG. 1 except that the first digit has been changed to correspond to the figure number. The circuits of FIG. 2. and 3 function substantially in the same manner as the circuit of FIG. 1. While it is possible with the arrangement shown in FIG. 2 to eliminate two asymmetrically conducting devices and a base current limiting resistor, it has been found that this arrangement does not have the operating capacity of the arrangement shown in FIGS. 1 and 3.

Since changes may be made in the above-described arrangement and different embodiments may be devised by those skilled in the art without departing from the spirit and scope of the invention, it is to be understood that all matter contained in the foregoing description and accompanying drawings is illustrative of the application of the principles of the invention and is not to be construed in in a limiting sense.

What is claimed is:

1. In a transistor oscillator a pair of transistors each having first, second, and third electrodes, an inductance device having a plurality of windings, means for connecting the first electrode of each of said transistors, means for connecting the second electrode of each of said transistors, said means comprising one of said plurality of windings, a direct-current source, said direct-current source connecting each of said first electrodes of said transistors to the said one of said plurality of windings, means for biasing each of said transistors, said means comprising an individual one of said plurality of windings, a capacitor, means for connecting the third electrode of each of said transistors, said means comprising another of said plurality of windings, means for connecting said biasing windings, said means comprising said capacitor.

2. In a converter circuit a pair of transistors each having first, second, and third electrodes, an inductance device having first, second, third, and fourth windings, means for connecting the first electrodes of each of said transistors, means for connecting the second electrodes of each of said transistors, said means comprising said first winding, a direct-current source, said direct-current source connecting each of said first electrodes to said first winding, means for biasing each of said transistors, said means comprising said second and third windings, a capacitor, a variable impedance, means for connecting the third electrodes of each of said transistors, said means comprising said fourth winding, and said variable impedance, means for connecting said second and third windings, said means comprising said capacitor.

3. A converter circuit comprising first and second transistors each having base, collector and emitter electrodes, an inductance device having first, second, third, and fourth windings, first, second, third, and fourth asymmetrically conducting devices, means for connecting the collector electrodes of said transistors, said means comprising said first winding, means for serially connecting the base electrode of said first transistor, said second winding, said first asymmetrically conducting device and the emitter electrode of said first transistor, means for serially connecting the base electrode of said second transistor, said third winding, said second asymmetrically conducting device and the emitter electrode of said second transistor, a variable impedance, means for serially connecting the base electrodes of said first and second transistors, said means comprising said fourth winding and said variable impedance means, a direct-current source, means for connecting one terminal of said direct-current source to said first winding, means for connecting the other terminal of said direct-current source to the emitter electrode of each of said transistors, said means comprising said third and fourth asymmetrically conducting devices, a capacitor, means for connecting said second and third windings, said means comprising said capacitor.

4. A converter circuit comprising first and second transistors each having base, collector, and emitter electrodes, an inductance device having first, second, third, and fourth windings, first and second asymmetrically conducting devices, means for connecting the collector electrodes of said transistors, said means comprising said first winding, means for connecting the base electrodes of each of said transistors, a variable impedance, means for serially connecting said first asymmetrically conducting device, said second winding, said variable impedance, said fourth winding, said third winding, and said second asymmetrically conducting device, a capacitor, means for serially connecting the emitter electrode of each of said transistors, said means comprising said second and third windings and said capacitor, means for connecting the base electrode of each of said transistors to said first and second asymmetrically conducting devices, a direct-current source, said direct-current source connecting said first and second asymmetrically conducting devices to said first winding.

5. A converter circuit comprising first and second transistors each having base, collector, and emitter electrodes, an inductance device having first, second, third, and fourth windings, first, second, third, and fourth asymmetrically conducting devices, means for connecting the collector electrodes of said transistors, means for serially connecting the emitter electrodes of said transistors, said means comprising said first winding and said first and second asymmetrically conducting devices, means for serially connecting the base electrode of said first transistor, said second winding, said third asymmetrically conducting device and the emitter electrode of said first transistor, means for serially connecting the base electrode of said second transistor, said third winding, said fourth asymmetrically conducting device and the emitter electrode of said second transistor, a variable impedance, means for connecting the base electrodes of said first and second transistor, said means comprising said fourth winding and said variable impedance, a capacitor, means for connecting said second and third windings, said means comprising said capacitor, a direct-current source, said direct-current source connecting each of said collector electrodes to said first winding.

6. A converter circuit comprising first and second transistors each having base, collector, and emitter electrodes, an inductance device having first, second, third and fourth windings, first second, third, and fourth asymmetrically conducting devices, means for connecting the collector electrodes of said transistors, said means comprising said first winding, first and second resistors, means for serially connecting the base electrode of said first transistor, said second winding, said first asymmetrically conducting device, said first resistor and the emitter electrode of said first transistor, means for serially connecting the base electrode of said second transistor, said third winding, said second asymmetrically conducting device, said second resistor and the emitter electrode of said second transistor, a variable impedance, means for connecting the base electrodes of said first and second transistors, said means comprising said fourth winding and said variable impedance, a direct-current source, means for connecting one terminal of said direct-current source to said first winding, means for connecting the other terminal of said direct-current source to the emitter electrodes of each of said transistors, said means comprising said third and fourth asymmetrically conducting devices, a capacitor, means for connecting said second and third windings, said means comprising said capacitor.

7. A converter circuit comprising first and second transistors each having base, collector, and emitter electrodes, an inductance device having first, second, third, and fourth windings, first and second asymmetrically conducting devices, means for connecting the collector electrodes of said transistors, said means comprising said first winding, means for connecting the base electrodes of each of said transistors, a variable impedance, means for serially connecting said first asymmetrically conducting device, said second winding, said variable impedance, said fourth winding, said third winding, and said second asymmetrically conducting device, a capacitor, means for serially connecting the emitter electrodes of each of said transistors, said means comprising said second and third windings and said capacitor, means for connecting the base electrode of each of said transistors to said first and second asymmetrically conducting device, a direct-current source, a resistor, means for connecting the base electrodes of said first and second transistors to said first and second asymmetrically conducting devices, said means comprising said resistor, means for connecting the base electrodes of said first and second transistors to said first winding, said means comprising said direct-current source.

8. A converter circuit comprising first and second transistors each having base, collector, and emitter electrodes, an inductance device having first, second, third and fourth windings, first, second, third, and fourth asymmetrically conducting devices, means for connecting the collector electrodes of said transistors, means for serially connecting the emitter electrodes of said transistors, said means comprising said first winding and said first and second asymmetrically conducting devices, first and second resistors, means for serially connecting the base electrode of said first transistor, said second winding, said third asymmetrically conducting device, said first resistor and the emitter electrode of said first transistor, means for serially connecting the base electrode of said second transistor, said third winding, said fourth asymmetrically conducting device, said second resistor and the emitter electrode of said second transistor, a variable impedance, means for connecting the base electrodes of said first and second transistor, said means comprising said fourth winding and said variable impedance, a capacitor, means for connecting said second and third windings, said means comprising said capacitor, a direct-current source, said direct-current source connecting each of said collector electrodes of said first winding.

References Cited in the file of this patent

UNITED STATES PATENTS

| | | |
|---|---|---|
| 2,896,146 | Jenkins | July 21, 1959 |
| 2,965,856 | Roesel | Dec. 20, 1960 |